United States Patent
Möller et al.

[11] 3,723,492
[45] Mar. 27, 1973

[54] PROCESS FOR PREPARING CELLULAR POLYURETHANES

[75] Inventors: Friedrich Möller, Leverkusen; Manfred Roegler, Bad Godesberg; Walter Simmler, Cologne; Armand De Montigny, Leverkusen, all of Germany

[73] Assignee: Bayer Aktiengesellschaft, Leverkusen, Germany

[22] Filed: June 28, 1971

[21] Appl. No.: 157,684

[30] Foreign Application Priority Data

June 30, 1970 Germany..................P 20 32 186.2

[52] U.S. Cl. ........260/448.8 R, 252/426, 260/2.5 AC
[51] Int. Cl..............................................C07f 7/18
[58] Field of Search.................260/448.8 R, 448.2 N

[56] References Cited

UNITED STATES PATENTS 3,448,137   6/1969   Niederprüm et al...........260/448.8 R
3,479,383   11/1969  Klebe........................260/448.8 R X Primary Examiner—Daniel E. Wyman
Assistant Examiner—P. F. Shaver
Attorney—Sylvia Gosztonyi et al.

[57] ABSTRACT

A method is provided for preparing cellular polyurethanes which comprises reacting in the presence of a blowing agent an organic polyisocyanate with a polyether or polyester containing at least two hydroxyl groups in the presence of a catalytic amount of a catalyst having the formula

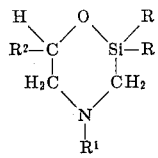

in which $R$ is an alkyl radical having one or two carbon atoms, $R^1$ is an alkyl radical having one or two carbon atoms or a dialkylaminoalkyl group having the formula

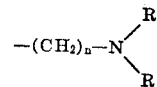

in which $n$ is an integer of from one to three and $R$ is an alkyl radical having one ro two carbon atoms, and $R^2$ is a dialkylaminoalkyl group having the formula

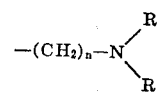

in which $n$ is an integer of from one to three and $R$ is an alkyl radical having one or two carbon atoms with the proviso that when $R^1$ is a dialkyl amino alkyl group, $R^2$ is hydrogen.

This invention also encompasses new silicon compounds having the formulas

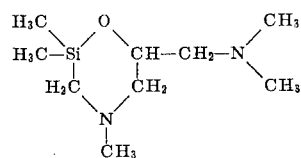

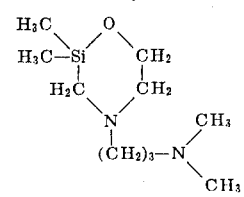

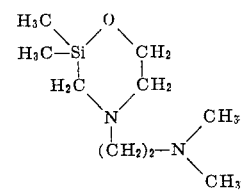

3 Claims, No Drawings

PROCESS FOR PREPARING CELLULAR POLYURETHANES

It is known to use compounds which act as catalysts, of the type described in German Auslegeschriften Nos. 1,239,468 and 1,229,290, for the production of polyurethane foam resins from polyethers and polyesters. These compounds are preferred to the catalysts hitherto known because of their catalytic activity, especially their activity in the presence of higher molecular weight polyhydroxyl compounds which have a low hydroxyl group content. The polyhydroxyl compounds described above, in most cases, consist of linear or branched polyethers and/or polyesters.

It was found, however, that reaction products which had been catalysed with the compounds described in the above mentioned Auslegeschriften were not completely satisfactory in their physical properties as foams, in cases where polyesters had been used. In some cases, the foam resins produced have such a very closed cell structure that they can serve no useful purpose, and foams may even completely fail to be formed because of total shrinkage.

In cases where polyethers are used in accordance with the Auslegeschriften mentioned above, the foam resins produced also have a partly closed cell structure. Moreover, the reaction times required when small quantities of water are used, (less than 1.5 parts of water per 100 parts of polyether), are excessively long.

It was, therefore, an object of the present invention to find a catalyst which, when used in the cases described above, would positively effect both the expanding reaction and the cross-linking reaction with a catalytic activity comparable to that of the known activators, and would hence give rise substantially satisfactory end products.

It has now, surprisingly, been found that the compounds according to the invention are eminently suitable for activating polyester systems and corresponding polyether systems and give rise to open cell foams within short reaction times even in the presence of small quantities of water.

It is therefore an object of the invention to provide a method for preparing cellular polyurethanes which comprises reacting in the presence of a blowing agent an organic polyisocyanate with a polyether or polyester containing at least two hydroxyl groups in the presence of a catalytic amount of a catalyst having the formula

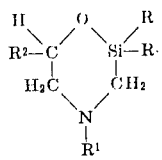

in which $R$ is an alkyl radical having one or two carbon atoms, $R^1$ is an alkyl radical having one or two carbon atoms or a dialkylaminoalkyl group having the formula

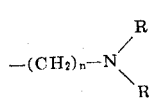

in which $n$ is an integer of from one to three and $R$ is an alkyl radical having one or two carbon atoms, and $R^2$ is a dialkylaminoalkyl group having the formula

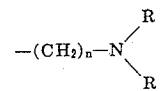

in which $n$ is an integer of from one to three and $R$ is an alkyl radical having one or two carbon atoms with the proviso that when $R^1$ is a dialkylaminoalkyl group, $R^2$ is hydrogen.

The present invention also relates to new silicon compounds of the formulae

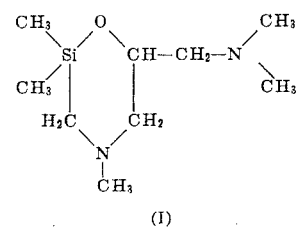

(I)

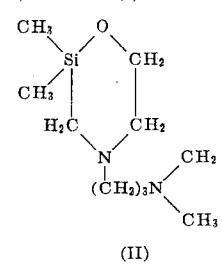

(II)

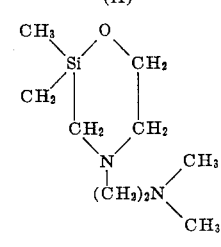

(III)

These compounds are, at the same time, the catalysts preferentially used for the process according to the invention. These compounds are prepared, e.g., by reacting amino alcohols of the formula

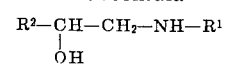

in which $R^1$ and $R_2$ have the meaning already indicated with bromomethyl-dimethyl-ethoxysilane in the presence of triethylamine, e.g., in the temperature range of 20° C. to 80° C. The starting materials used for the production of the polyurethane foams may be hydroxyl-containing polyethers and/or polyesters which generally have a molecular weight of 500 – 10,000, preferably from 800 – 5,000 and which are known per se. The polyesters may be prepared, e.g., by polycondensation of polyhydroxyl compounds with polycarboxylic acids, e.g., by polycondensation of adipic acid with butanediol, whereas the polyethers are obtained by addition reactions of alkylene oxides such as ethylene and/or propylene oxide with starting molecules such as water, alcohols or amines. The polyesters and/or polyethers used as starting material have at least two hydroxyl groups and generally from 2 – 6 hydroxyl groups. Polyesters and polyethers useful according to the invention are, e.g., mentioned in U.S. Pat. No. 3,201,362.

The polyisocyanates used for production of polyurethane foam resins may be aliphatic, cycloaliphatic, araliphatic and/or aromatic polyisocyanates of known type, e.g., hexamethylene diisocyanate, hexahydro-2,4- and 2,6-tolyene diisocyanate, 2,4- and 2,6-tolylene diisocyanate, 4,4'-diphenylmethane diisocyanate or polyphenyl polymethylene polyisocyanates which may be obtained by aniline formaldehyde condensation followed by phosgenation. Polyisocyanates which are useful according to the invention are mentioned, e.g., in U.S. Pat. No. 3,350,362. Stabilizers such as commercial polyether siloxanes and emulsifiers such as sulphonated castor oil may be used as auxiliary agents. Furthermore, conventional catalysts may be used in addition to the catalysts to be used according to the invention. Suitable blowing agents are water and/or low-boiling organic compounds such as monofluorotrichloromethane.

The silicon compounds used as catalysts according to the invention are applied in amounts from about 0.05 to 5 parts by weight, preferably 0.05 to 1 part by weight, based on 100 parts of the polyester and/or polyether.

The foam resins are produced in a known manner, e.g., with the aid of continuously operating mixing apparatus, either by the one-shot process or by the prepolymer or semiprepolymer process. The catalysts which are to be used according to the invention may, of course, also be used in the process of foaming in the mould, which is known per se.

The compounds used according to the invention, in many cases, lead to shorter reaction times than the best known activators, as the experiments described below will illustrate. In all cases, however, they give rise to products which have good mechanical properties.

The following Examples illustrate the invention:

EXAMPLE 1 a. Preparation of 1-dimethylamino-3-methylaminopropanol-(2)

925 g (10 mol) of epichlorohydrin are added to 450 g (10 mol) of anhydrous dimethylamine and 25 g of water in the course of one hour. The temperature is controlled by cooling, being maintained at 5° C – 10° C during the first 15 minutes, then at 10° C – 15° C for 15 minutes and finally at 15° C – 20° C for 30 minutes. After the addition of epichlorohydrin, the reaction mixture is stirred at 20° C for 1½ hours at 20° C – 25° C for one hour.

4.65 kg of a 30% methylamine solution (45 mol) are heated to 50° C in a 10 liter three-necked stirrer flask which is equipped with stirrer, dropping funnel, thermometer and reflux condenser and which is connected by a glass tube to an ice-cooled receiver containing 1200 g of water. The solution described above, which has been cooled to 5° C, is added to the methylamine solution in the course of one hour while the temperature is maintained at 50° C by cooling. After introduction of the solution, the reaction mixture is stirred for one hour at 60° C and the temperature is then raised to 100° C in the course of 2 hours. After further stirring for one hour at 100° C, 1 kg of 45% sodium hydroxide solution is added and stirring is then continued for one hour at 100° C.

The unreacted methylamine distils off into the receiver filled with water and can be used again for the next batch.

The reaction mixture remaining in the flask is cooled to 80° C – 90° C and 1 kg of potassium carbonate is added. The top layer formed is removed while hot and fractionated over a 40 cm-column under vacuum. After a first runnings of water, 950 g (72% of the theory) of 1-dimethylamino-3-methylaminopropanol-(2) of boiling point 80° – 81°C/11 mm Hg are obtained.

b. Preparation of compound (I)

139.8 g (1.38 mol) of dried triethylamine are first added to a solution of 236 g (1.2 mol) of bromomethyl-dimethylethoxy-silane and 300 g of benzene, and after this addition 166.5 g (1.26 mol) of the aforementioned alkanolamine are then slowly added. An exothermic reaction takes place causing the mixture to heat up from 20° C to 80° C within 30 minutes. This temperature is maintained by heating for about 7 hours. The reaction mixture is then cooled and filtered from the precipitated salt. All the benzene is removed from the filtrate by distillation at 60 to 100 mm Hg and at a temperature of at the most 96° C. The residue is freed from a lower phase (24.2 g) and then fractionally distilled. 210 g (86% of the theory) of a water-clear compound having a boiling point of 39°C/1 mm Hg is obtained which according to analysis and NMR-spectrum has the structure (I).

| Analyses: | Molecular weight | % Basic N | % Si | % H | % C |
|---|---|---|---|---|---|
| calculated: | 202 | 13.8 | 13.8 | 10.9 | 53.4 |
| found: | 199 | 13.8 | 12.9 | 10.9 | 53.5 |

The preparation of compounds II and III is carried out analogously, using N-dimethylaminoethyl ethanolamine and N-dimethylaminopropyl ethanolamine, respectively, instead of 1-dimethylamino-3-methylaminopropanol-(2).

Compound II

Boiling point: 45°C/0.15 mm Hg; $n^{20}_D$ : 1.4538; yield: 65 percent of the theory.

| Analysis | Molecular weight | C | N | H | Si |
|---|---|---|---|---|---|
| calculated: | 216 | 55.6 | 12.95 | 11.1 | 12.95 |
| found: | 223 | 55.4 | 12.78 | 11.5 | 12.0 |

Compound III

Boiling point: 41°C/0.35 mm Hg; $n^{20}_D$ : 1.4543; yield: 65.0 percent of the theory.

| Analysis | Molecular weight | C | N | H | Si |
|---|---|---|---|---|---|
| calculated: | 202 | 53.4 | 13.8 | 10.9 | 13.8 |
| found: | 212 | 53.4 | 13.72 | 11.0 | 12.3 |

Comparison Example 1

The following components are mixed together with vigorous stirring in the mixing chamber of a foaming apparatus:

100.0 parts by weight of a slightly branched polyester which has been obtained by the condensation of adipic acid with diethylene glycol and trimethylolpropane and which has a hydroxyl number of 60 with an average molecular weight of 2,500, 40.0 parts by weight of tolylene diisocyanate (65% of 2,4-and 35% of 2,6-isomer), 3.0 parts by weight of water, 1.5 parts by weight of a commercial polyetherpolysiloxane, e.g., the product L 532 of Union Carbide, 1.0 part by weight of 2;2,4-trimethyl-2-silamorpholine and 0.5 parts by weight of ethoxylated hexahydrotriazine.

The starting time was 20 seconds. The expanding time was 89 seconds, and a very closed foam structure was formed after a setting time of 60 seconds.

EXAMPLE 2

If 2,2,4-trimethyl-2-silamorpholine in the mixture described in comparison test 1 is replaced by compound (I), a foam which has a substantially perfect cell structure after a setting time of 37 seconds and excellent permeability to water is obtained after a starting time of 15 seconds and an expanding time of 64 seconds.

EXAMPLE 3

If compound (II) is used as catalyst in the above mixture, a foam which has open cells ensuring good permeability to air is again obtained within the times indicated in Table 1.

EXAMPLE 4

In contrast to the catalyst used in comparison Example 1, catalyst (III) used in the same mixture gives rise to a product which is characterized by its excellent permeability to air (see also Table 1).

TABLE 1

| Catalyst | Starting time (sec) | Expanding time (sec) | Setting time (sec) | Nature of foam resin |
|---|---|---|---|---|
| 2,2,4-trimethyl-2-silamorpholine | 20 | 89 | 60 | very closed |
| (I) | 15 | 64 | 37 | satisfactory, good permeability to air |
| (II) | 13 | 38 | 10 | " " |
| (III) | 17 | 62 | 42 | " " |

Comparison test 2

The following components are thoroughly mixed together:
- 100.0 parts by weight of a propylene glycol of hydroxyl number 49 (average molecular weight approximately 3,200) which has been partly branched with trimethylol propane and modified with ethylene oxide,
- 40.1 parts by weight of tolylene diisocyanate (80% of 2,4- and 20% of 2,6-isomer),
- 3.0 parts by weight of water,
- 1.0 parts by weight of a commercial polyether polysiloxane (e.g., L 520 of Union Carbide),
- 0.2 parts by weight of 2,2,4-trimethyl-2-silamorpholine and
- 0.2 parts by weight of tin(II)octoate.

After a starting time of 10 seconds, a very closed foam resin is formed following a very brief expanding and setting time (40 seconds and 10 seconds respectively). The foam resin undergoes such severe shrinkage that it cannot be used.

EXAMPLE 5

If 2,2,4-trimethyl-2-silamorpholine in the mixture described in comparison Example 2 is replaced by compound (I), a satisfactory foam resin having good permeability to air is obtained within approximately comparable times.

EXAMPLE 6

When catalyst (II) is used instead of the known catalyst in the formulation in comparison Example 2, a foam resin of excellent quality with good permeability to air is obtained although after slightly longer times (see Table 2).

EXAMPLE 7

If 2,2,4-trimethyl-2-silamorpholine in comparison Example 2 is replaced by compound (III), a satisfactory foam which has good permeability to air is obtained within the times indicated in Table 2.

TABLE 2

| Catalyst | Starting time (sec) | Expanding time (sec) | Setting time (sec) | Nature of the foam |
|---|---|---|---|---|
| 2,2,4-trimethyl-2-silamorpholine | 10 | 40 | 10 | total shrinkage |
| (I) | 15 | 59 | 14 | satisfactory foam, good permeability to air |
| (II) | 19 | 88 | 21 | " " |
| (III) | 18 | 71 | 22 | " " |

What is claimed is:

1. 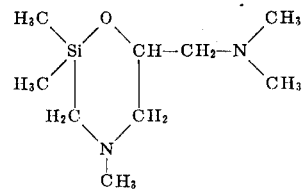

2. 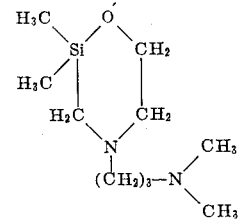

3. 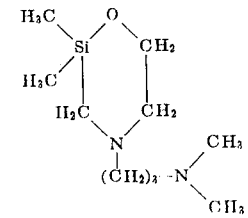

* * * * *